United States Patent
Sun (10) Patent No.: US 11,122,109 B2
(45) Date of Patent: Sep. 14, 2021

(54) METHOD FOR SHARING INFORMATION, ELECTRONIC DEVICE AND NON-TRANSITORY STORAGE MEDIUM

(71) Applicant: Beijing Xiaomi Mobile Software Co., Ltd., Beijing (CN)

(72) Inventor: Yongli Sun, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 0 days.

(21) Appl. No.: 16/548,193

(22) Filed: Aug. 22, 2019

(65) Prior Publication Data
US 2020/0137143 A1   Apr. 30, 2020

(30) Foreign Application Priority Data
Oct. 31, 2018  (CN) .......................... 201811290664.0

(51) Int. Cl.
  *H04L 29/08*  (2006.01)
  *G06F 16/955*  (2019.01)
  *G06F 9/54*  (2006.01)
(52) U.S. Cl.
  CPC .............. *H04L 67/06* (2013.01); *G06F 9/543* (2013.01); *G06F 16/9566* (2019.01);
  (Continued)
(58) Field of Classification Search
  CPC ......... H04L 67/06; H04L 67/02; H04L 67/26; H04L 67/306; H04L 51/32; H04L 51/00;
  (Continued)

(56) References Cited

U.S. PATENT DOCUMENTS 9,049,176 B2 * 6/2015 Ferdowsi
9,210,210 B2 * 12/2015 Lee ................... H04L 67/2828
(Continued)

FOREIGN PATENT DOCUMENTS

CN    106533926 A    3/2017
CN    108363734 A    8/2018

OTHER PUBLICATIONS

Extended European Search Report for Application No. 19195394.2, dated Feb. 4, 2020.
(Continued)

*Primary Examiner* — Mohamed A. Wasel
*Assistant Examiner* — Rachel J Hackenberg
(74) *Attorney, Agent, or Firm* — Finnegan, Henderson, Farabow, Garrett & Dunner, L.L.P.

(57) ABSTRACT

A method for sharing information includes: responsive to detecting a sharing request triggered by a first user, determining whether a second operation is required to be performed based on uniform resource locator (URL) information of content to be shared to view the content to be shared; responsive to determining that the second operation is required to be performed based on the URL information of the content to be shared to view the content to be shared, acquiring a screenshot of the content to be shared; and sending the screenshot of the content to be shared to an electronic device of a second user to enable the second user to view the content to be shared based on the screenshot of the content to be shared.

18 Claims, 6 Drawing Sheets

Responsive to detecting a sharing request triggered by a user, determining whether a second operation is required to be performed based on URL information of content to be shared to view the content to be shared — 201

Responsive to determining that the second operation is required to be performed based on the URL information of the content to be shared to view the content to be shared, acquiring a screenshot of the content to be shared — 202

Sending he screenshot of the content to be shared to an electronic device of another user to enable the electronic device of the other user to view the content to be shared based on the screenshot of the content to be shared — 203

(52) U.S. Cl.
CPC .............. *H04L 67/02* (2013.01); *H04L 67/26* (2013.01); *H04L 67/306* (2013.01)

(58) Field of Classification Search
CPC .... G06F 16/9566; G06F 9/543; G06F 3/0482; G06F 3/04842; H04M 1/72547; H04M 1/72552; H04M 1/72555; H04W 4/21; H04W 12/02; H04W 4/14
See application file for complete search history.

(56) References Cited

U.S. PATENT DOCUMENTS

| | | | |
|---|---|---|---|
| 9,306,950 B2 * | 4/2016 | Yasukawa | ................ H04L 67/02 |
| 2008/0313703 A1 * | 12/2008 | Flaks | .................... H04L 63/101 |
| | | | 726/2 |
| 2010/0274858 A1 * | 10/2010 | Lindberg | ................ G06F 9/452 |
| | | | 709/206 |
| 2015/0220500 A1 | 8/2015 | Katic | |

OTHER PUBLICATIONS

*How to show the page preview if we're sharing private pages?* Aug. 2, 2016, retrieved from https://support.google.com/edu/classroom/forum/AAAAq1rTZJo71W8-sbmFcI/?h1=en, Jan. 22, 2020, 3 pages.
*Apparatus and method of Sharing Rich Information by Picture,* IP.com Journal, IP.com Inc., Sep. 10, 2015, XP013169483, ISSN: 1533-0001, 10 pages.

\* cited by examiner

METHOD FOR SHARING INFORMATION, ELECTRONIC DEVICE AND NON-TRANSITORY STORAGE MEDIUM

CROSS-REFERENCE TO RELATED APPLICATION

This application is based on and claims priority to Chinese Patent Application No. 201811290664.0, filed on Oct. 31, 2018, the content of which is hereby incorporated by reference in its entirety.

TECHNICAL FIELD

The present disclosure relates to the technical field of internet, and particularly to a method for sharing information, an electronic device and a non-transitory storage medium.

BACKGROUND

In the internet era, information sharing becomes increasingly popular. When browsing valuable information through an application in an electronic device (for example, a mobile phone), a user usually shares the information with another user to achieve information sharing.

In the related art, a sharing button is usually set on a page of sharable information of an application, and a user may click the sharing button to acquire uniform resource locator (URL) link information of the present page and send a URL link to the other user. The other user, responsive to that the URL link of the shared information is received, may open the page corresponding to the URL link through a browser in the mobile phone, thereby reading the shared information. However, during a practical application, the other user may open a page shared by the user only after logged in, or the page may be accessed in a specific network environment. The other user, when receiving a URL link of the shared information meeting the above conditions, is required to execute a second operation on the mobile phone to browse the information.

SUMMARY

According to a first aspect of the embodiments of the present disclosure, a method for sharing information includes: responsive to detecting a sharing request triggered by a first user, whether a second operation is required to be performed based on URL information of content to be shared to view the content to be shared is determined; responsive to determining that the second operation is required to be performed based on the URL information of the content to be shared to view the content to be shared, acquiring a screenshot of the content to be shared; and sending the screenshot of the content to be shared is sent to an electronic device of a second user to enable the second user to view the content to be shared based on the screenshot of the content to be shared.

According to a second aspect of the embodiments of the present disclosure, an electronic device of a first user includes: a processor; a memory configured to store instructions executable by the processor; and a transmitter. The processor is configured to, responsive to detecting a sharing request triggered by the first user, determine whether a second operation is required to be performed based on URL information of content to be shared to view the content to be shared, and responsive to determining that the second operation is required to be performed based on the URL information of the content to be shared to view the content to be shared, acquire a screenshot of the content to be shared; and the transmitter is configured to send the screenshot, acquired by the processor, of the content to be shared to an electronic device of a second user to enable the second user to view the content to be shared based on the screenshot of the content to be shared.

According to a third aspect of the embodiments of the present disclosure, a non-transitory computer-readable storage medium has stored thereon a computer program that, when executed by a processor of an electronic device, causes the electronic device to perform the method in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

These accompanying drawings and textual descriptions are intended to explain concepts of the present disclosure to those of ordinary skill in the art with reference to specific embodiments, and do not mean to improperly limit the scope of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the present disclosure. Instead, they are merely examples of apparatuses and methods consistent with aspects related to the present disclosure as recited in the appended claims.

Embodiments of the present disclosure may involve the following application scenario.

An information sharing method provided in the embodiments of the present disclosure is applied to an electronic device. Applications are installed in the electronic device. A user browses information through an application and shares browsed information to an electronic device of another user.

The electronic device may include a terminal such as a smart phone, a tablet computer, a wearable device, etc. The electronic device may be provided with a display screen, for example, a touch screen. The applications may include, for example, shopping applications, instant chatting applications, social websites, news websites and browsers.

Figure 1:
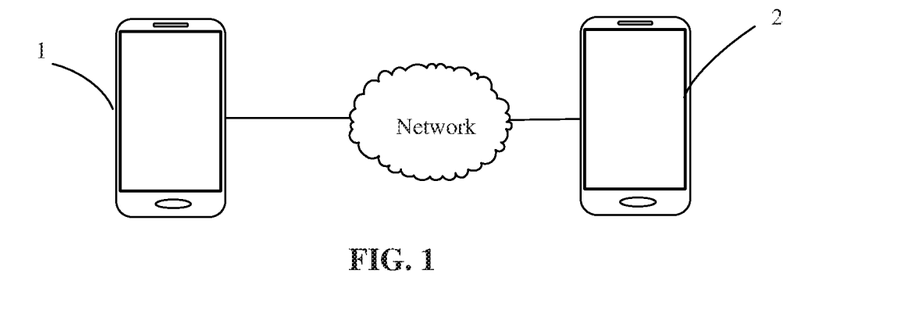
FIG. 1 illustrates a schematic diagram of an application scenario of a method for sharing information according to an embodiment.

FIG. 1 is a schematic diagram of an application scenario according to art embodiment. The application scenario includes an electronic device 1 and an electronic device 2. The electronic device 1 may be an electronic device of a user for sharing information, and the electronic device 2 may be an electronic device of a user for receiving the shared information. There may be multiple electronic devices 2.

The electronic device 1 may be connected with the electronic device 2 through a network such as a 3rd-Generation (3G), 4th-Generation (4G) or Wireless Fidelity (WIFI) communication network.

The technical solutions of the present disclosure will be described below with specific embodiments in detail. The following specific embodiments may be combined, and the same or similar concepts or processes may not be elaborated in some embodiments.

Figure 2:
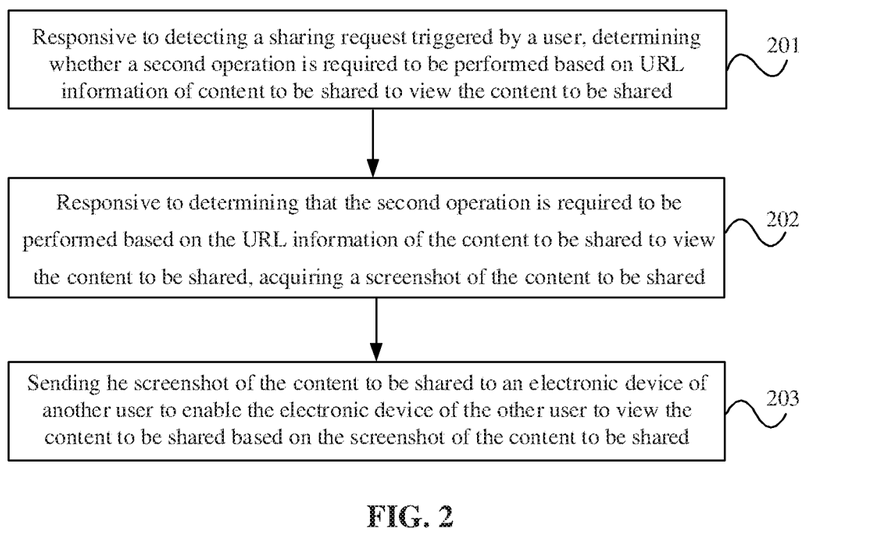
FIG. 2 illustrates a flow chart of a method for sharing information according to an embodiment.

FIG. 2 illustrates a flow chart of a method for sharing information according to art embodiment. The method may be performed by an electronic device. As illustrated in FIG. 2, the method provided in the embodiment includes the following operations illustrated in blocks 201 to 203.

At block 201, responsive to detecting a sharing request triggered by a user, it is determined whether a second operation is required to be performed based on uniform resource locator (URL) information of content to be shared to view the content to be shared.

In an embodiment, a sharing request is triggered when a user browses information in an application and wants to share it to another user. For example, the sharing request may be triggered by clicking a sharing button in an operation interface of the application. The electronic device, responsive to detecting the sharing request triggered by the user, determines whether the second operation is required to be performed by the other user based on the URL information of the content to be shared to view the content to be shared.

For example, the other user, after clicking a URL link of the content to be shared, may view the content to be shared only after logged in with account information. Therefore, operations of viewing the content to be shared by the user are relatively complex and difficulty in viewing the shared information may be relatively high.

At block 202, responsive to determining that the second operation is required to be performed based on the URL information of the content to be shared to view the content to be shared, a screenshot of the content to be shared is acquired.

In an embodiment, responsive to determining that the second operation is required to be performed based on the URL information of the content to be shared to view the content to be shared, the screenshot of the content to be shared is directly acquired. For example, the interface of the application browsed by the user is captured, or, some key contents on the interface are captured.

At block 203, the screenshot of the content to be shared is sent to an electronic device of another user to enable the electronic device of the other user to view the content to be shared based on the screenshot of the content to be shared.

In the embodiment, after the screenshot is acquired, the screenshot may be directly shared to the other user, namely sent to the electronic device of the other user, to enable the other user to directly view the content to be shared through the screenshot.

Figure 3:
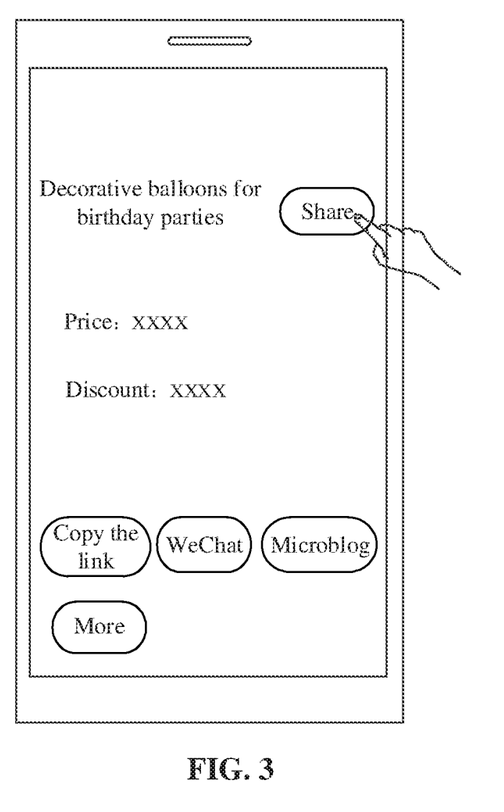
FIG. 3 illustrates a schematic diagram of an interface for sharing information according to an embodiment.

As illustrated in FIG. 3, for example, the user searching for merchandise on a shopping website and intending to share merchandise information to the other user, clicks a sharing button on an operation interface and selects an application such as WeChat, Microblog and the like to share the merchandise information to the other user. The electronic device, responsive to detecting a sharing request triggered by the user by clicking the sharing button, determines whether the second operation is required to be performed based on the URL information of the content to be shared to view the content to be shared. Responsive to determining that the second operation is required to be performed based on the URL information of the content to be shared to view the content to be shared, the electronic device takes a screenshot of the merchandise information, for example, takes a screenshot of the whole interface, and sends the screenshot to the electronic device of the other user. If the user clicks WeChat after clicking the sharing button, the screenshot is sent to the electronic device of the other user through WeChat, namely the other user may view the screenshot, through WeChat in the electronic device.

According to the method of the embodiment, responsive to detecting the sharing request triggered by the user, it is determined whether the second operation is required to be performed based on the URL information of the content to be shared to view the content to be shared; responsive to determining that the second operation is required to be performed based on the URL information of the content to be shared to view the content to be shared, the screenshot of the content to be shared is acquired; and the screenshot of the content to be shared is sent to the electronic device of the other user to enable the other user to directly view the content to be shared based on the screenshot of the content to be shared, so that operations of viewing the content to be shared by the user are simplified, difficulty for the user in viewing the content to be shared is reduced, experience of the user in viewing the content to be shared is improved, occurrence of the condition of sharing failure caused by inconvenience for the user in viewing the content to be shared is avoided, and an information sharing success rate is increased.

In some embodiments, the operation of determining whether the second operation is required to be performed based on the URL information of the content to be shared to view the content to be shared (block 200 may be implemented in the following manner: whether a network in which the electronic device of the user is located is a private network is determined: and responsive to determining that the network in which the electronic device of the user is located is the private network, when a network in which the electronic device of the other user is located is not the private network, it is determined that the second operation is required to be performed based on the URL information of the content to be shared to view the content to be shared.

In an embodiment, the electronic device, responsive to detecting the sharing request triggered by the user, determines whether the network where the electronic device is located is the private network, for example, a specific virtual private network (VPN). If the electronic device has been connected with the VPN, it indicates that the page presently accessed by the electronic device may be a page which may be accessed only through a private network in a company or enterprise. If a URL link of the content to be shared is directly shared to the other user, the other user may not open the URL link, or the electronic device is also required to be connected with the corresponding VPN for access. Therefore, it may be necessary to further determine whether the network in which the electronic device of the other user is located is the private network. When the network in which the electronic device of the other user is located is not the private network, it is determined that the second operation is required to be performed based on the URL information of the content to be shared to view the content to be shared.

In some embodiments, the operation of determining whether the network in which the electronic device of the other user is located is the private network may be implemented in a request sending manner, as follows.

A request message is sent to the electronic device of the other user. The request message is to request an indication whether the network in which the electronic device of the other user is located is the private network.

Response information sent by the electronic device of the other user is received. The response information is to indicate whether the network in which the electronic device of the other user is located is the private network.

Furthermore, responsive to determining that the network in which the electronic device of the user is located is not the private network, whether the user is in a logged-in state is determined. The logged-in state may be a state after logged in with account information of the user.

Responsive to determining that the user is in the logged-in state, it is determined that the second operation is required to be performed based on the URL information of the content to be shared to view the content to be shared.

For example, responsive to determining that the network in which the electronic device is located is not the private network, whether the user is in the logged-in state, namely whether the user has logged in through the account information, may further be confirmed. When it is determined that the user is in the logged-in state, the electronic device determines that the second operation is required to be performed based on the URL information of the content to be shared to view the content to be shared.

Furthermore, responsive to determining that the network in which the electronic device of the user is located is not the private network and that the user is in a non-logged-in state, the URL information of the content to be shared is sent to the electronic device of the other user.

For example, when the electronic device does not access the private network and the user is in the non-logged-in state, the electronic device of the user sends the URL information of the content to be shared to the electronic device of the other user, namely the URL link may be directly sent to the electronic device of the other user, and the electronic device of the other user may directly open the URL link to view the content to be shared.

In another embodiment, the operation of determining whether the second operation is required to be performed based on the URL information of the content to be shared to view the content to be shared may be implemented in the following manner Whether the user is in the logged-in state is determined. The logged-in state may be a state after logged in with the account information of the user.

Responsive to determining that the user is in the logged-in state, it is determined that the second operation is required to be performed based on the URL information of the content to be shard to view the content to be shared.

For example, the electronic device may determine whether the second operation is required to be performed based on the URL information of the content to be shard to view the content to be shared directly by determining whether the user is in the logged-in state.

In an embodiment, the operation of determining whether the user is in the logged-in state may be implemented in the following manner.

The electronic device extracts a URL feature from the URL information of the content to be shared; and the electronic device determines whether the user is in the logged-in state based on the URL feature.

For example, the URL feature extracted from the URL link may include the account information such as a username and a password of the user.

Furthermore, when the electronic device determines that the second operation is required to be performed based on the URL information of the content to be shared to view the content to be shared, the URI, information of the content to be shared may further be sent to the electronic device of the other user to enable the electronic device of the other user to further operate the content to be shared, so that information sharing flexibility is improved.

In another embodiment, the operation of determining whether the second operation is required to be performed based on the URL information of the content to be shared to view the content to be shared may be implemented in the following manner.

Whether the user is in the logged-in state is determined. The logged-in state may be a state after logged in with the account information of the user.

Responsive to determining that the user is in the logged-in state, when the other user is in the non-logged-in state, it is determined that the second operation is required to be performed based on the URL information of the content to be shared to view the content to be shared.

In some embodiments, whether the other user is in the logged-in state may be.determined in the following manner.

A second request message is sent to the electronic device of the other user; and the second request message is to request an indication whether a user account in the electronic equipment of the other user is in the logged-in state or not.

Second response information sent by the electronic device of the other user is received. The second response information is to indicate whether the user account in the electronic equipment of the other user is in the logged-in state or in the non-logged-in state.

The user account in the present disclosure includes, but is not limited to, a registration account of the application that the user logs in and the like. The user may log in through the account to view a web page in the application program in the electronic device. Different web pages may correspond to different URLs.

The user being in the non-logged-in state includes, but is not limited to, that the corresponding application is installed in the electronic device of the user but the user does not log in the application with the account, and that the corresponding application is not installed in the electronic device of the user.

In some embodiments, when the user receives the request message (or the second request message) in the electronic device and if a corresponding operation right is opened in the electronic device of the user, corresponding information in the electronic device may be automatically read and corresponding response information may be automatically generated and fed back. If the corresponding operation right is not opened in the electronic device of the user, a notification message is sent to the user to notify whether the operation right is opened to the user or notify whether the other user is allowed to read the corresponding information in the electronic device to the user.

In the embodiment, it is determined whether the second operation is required to be performed based on the URL information of the content to be shared to view the content to be shared, to intelligently determine an information sharing manner. That is, when the second operation is required to be performed based on the URL inform on of the content to be shared to view the content to be shared, the screenshot of the content to be shared may be shared to enable the other user to directly view the content to be shared. Or, when the second operation is not required to be performed based on the URL information of the content to be shared to view the content to be shared, the URL information of the content to be shared may be shared. Therefore, reading cost of the other user is reduced, and information sharing experience of the user is improved.

The embodiments of the present disclosure also provide a method for sharing information, which may be applied to a second electronic device and includes the following operations.

A first request message sent by an electronic device (a first electronic device) of a user is received. The first request message is to request an indication whether a network in which an electronic device (a second electronic device) of another user is located is a private network.

First response information is generated. The first response information is to indicate whether the network in which the electronic device (the second electronic device) of the other user is located is the private network.

When a network in which the electronic device e first electronic device) of the user is located is the private network and the first response information indicates that the network in which the electronic device (the second electronic device) of the other user is located is not the private network, a screenshot, sent by the electronic device (the first electronic device) of the user, of a content to be shared is received.

The embodiments of the present disclosure also provide a method for sharing information, which may be applied to a second electronic device and includes the following operations.

A second request message sent by an electronic device (a first electronic device) of a user is received. The second request message is to request an indication whether another user (user of the second electronic device) is in a logged-in state.

Second response information is generated. The second response information is to indicate whether the other user (user of the second electronic device) is in the logged-in state.

When the user (user of the first electronic device) is in the logged-in state and the second response information indicates that the other user (user of the second electronic device) is in a non-logged in state, a screenshot, sent by the electronic device (the first electronic device) of the user, of a content to be shared is received.

Figure 4:
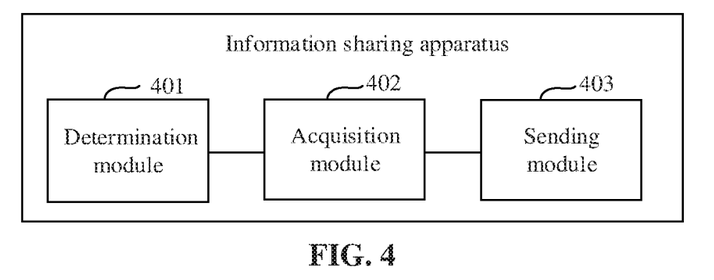
FIG. 4 illustrates a block diagram of an apparatus for sharing information according to an embodiment.

FIG. 4 illustrates a block diagram of an information sharing apparatus according to an embodiment. The information sharing apparatus may be implemented as part or all of an electronic device through software, hardware, or a combination of software and hardware. The information sharing apparatus includes a determination module 401, an acquisition module 402, and a sending module 403.

The determination module 401 is configured to, responsive to detecting a sharing request triggered by a user, determine whether a second operation is required to be performed based on URL information of content to be shared to view the content to be shared.

The acquisition module 402 is configured to, responsive to that the determination module 401 determines that the second operation is required to be performed based on URL information of content to be shared to view the content to be shared, acquire a screenshot of the content to be shared.

The sending module 403 is configured to send the screenshot of the content to be shared to an electronic device of another user to enable the other user to view the content to be shared based on the screenshot of the content to be shared.

In some embodiments, the determination module 401 may be configured to: determine whether a network in which an electronic device of the user is located is a private network; and responsive to determining that the network in which the electronic device of the user is located is the private network, when a network in which an electronic device of the other user is located is not the private network, determine that the second operation is required to be performed based on URL information of content to be shared to view the content to be shared.

In some embodiments, the sending module 403 may be configured to: send a request message to the electronic device of the other user, and the request message is to request an indication whether the network in which the electronic device of the other user is located is the private network.

The apparatus may further include a receiving module (not shown). The receiving module is configured to receive response information sent by the electronic device of the other user. The response information is to indicate whether the network in which the electronic device of the other user is located is the private network.

In some embodiments, the determination module 401 may be configured to: responsive to determining that the network in which the electronic device of the user is located is not the private network, determine whether the user is in a logged-in state, the logged-in state being a state after logged in with account information of the user; and responsive to determining that the user is in the logged-in state, determine that the second operation is required to be performed based on the URL information of the content to be shared to view the content to be shared.

In some embodiments, the determination module 401 may be configured to: determine whether the user is in the logged-in state, the logged-in state being a state after logged in with the account information of the user; and responsive to determining that the user is in the logged-in state, determine that the second operation is required to be performed based on the URL information of the content to be shared to view the content to be shared.

In some embodiments, the sending module 403 may be configured to: responsive to that the determination module determines that the network in which the electronic device of the user is located is not the private network and that the user is in a non-logged-in state, send the URL information of the content to be shared to the electronic device of the other user.

In some embodiments, the determination module 401 may be configured to: extract a URL feature from the URL information of the content to be shared; and determine whether the user is in the logged-in state based on the URL feature.

In some embodiments, the sending module 403 may be configured to: send the screenshot and the URL information of the content to be shared to the electronic device of the other user.

According to the information sharing apparatus provided in the embodiments, responsive to detecting the sharing request triggered by the user, it is determined whether the second operation is required to be performed based on the URL information of the content to be shared to view the content to be shared; responsive to determining that the second operation is required to be performed based on the URL information of the content to be shared to view the content to be shared, the screenshot of the content to be shared is acquired; and the screenshot of the content to be shared is sent to the electronic device of the other user to enable the other user to directly view the content to be shared based on the screenshot of the content to be shared, so that operations of viewing the content to be shared by the user are simplified, difficulty for the user in viewing the content to be shared is reduced, experience of the user in viewing the content to be shared is improved, occurrence of the condition of sharing failure caused by inconvenience for the user in viewing the content to be shared is avoided, and an information sharing success rate is increased.

With respect to the apparatus in the above embodiments, the specific manners for performing operations for individual modules therein have been described in detail in the method embodiments, which will not be elaborated herein.

Figure 5:
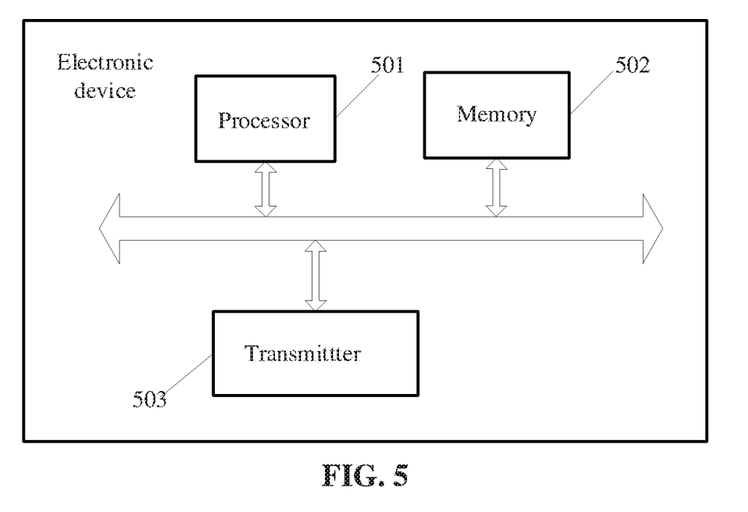
FIG. 5 illustrates a block diagram of an electronic device according to an embodiment.

FIG. 5 illustrates a block diagram of an electronic device according to an embodiment. As illustrated in FIG. 5, the electronic device includes: a processor 501, a memory 502 configured to store instructions executable by the processor 501, and a transmitter 503.

The components may communicate with each other through one or more buses.

The processor 501 is configured to, responsive to detecting a sharing request triggered by a user, determine whether a second operation is required to be performed based on URL information of content to be shared to view the content to be shared, and responsive to determining that the second operation is required to be performed based on the URL information of the content to be shared to view the content to be shared, acquire a screenshot of the content to be shared.

The transmitter 503 is configured to send the screenshot, acquired by the processor 501, of the content to be shared to an electronic device of another user to enable the other user to view the content to be shared based on the screenshot of the content to be shared.

Furthermore, the processor 501 is configured to execute the executable instructions to perform the above-described methods.

Figure 6:
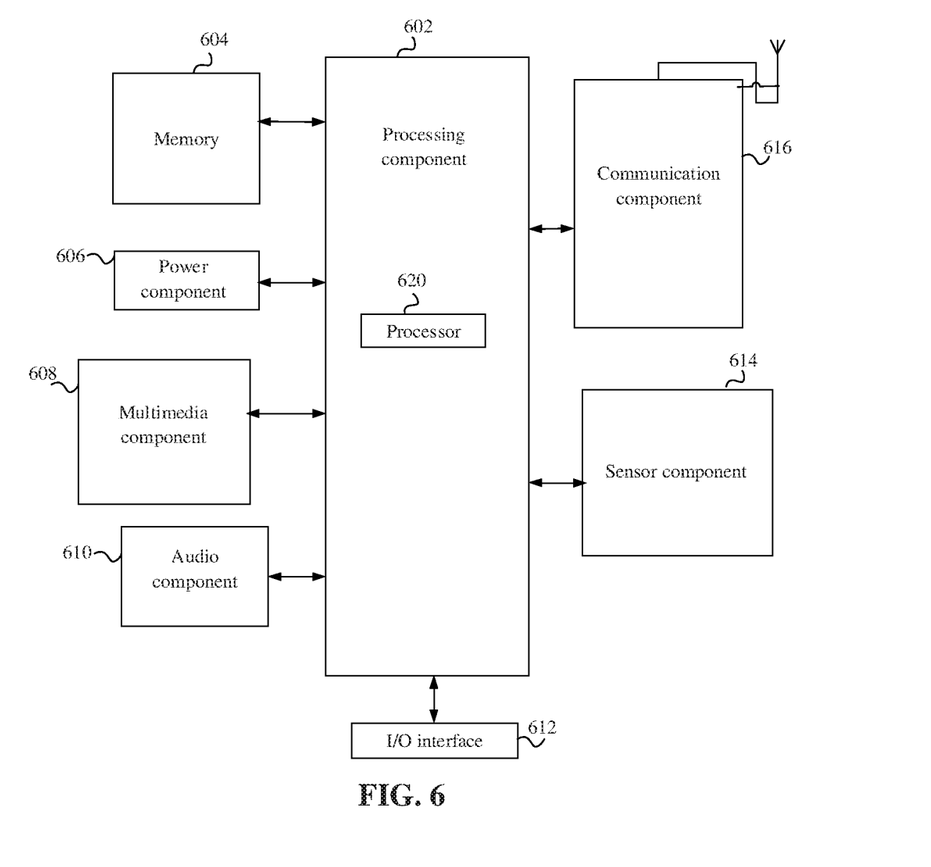
FIG. 6 illustrates a block diagram of an electronic device according another embodiment.

FIG. 6 illustrates a block diagram of an electronic device according to another embodiment. For example, the electronic device may be a smart phone, a computer, a tablet, a wearable device and the like.

As illustrated in FIG. 6, the electronic device may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the electronic device, such as operations associated with display, telephone calls, data communications, camera operations, and recording operations. The processing component 602 may include one or more processors 620 to execute instructions to perform all or part of the operations in the abovementioned method. Moreover, the processing component 602 may include one or more modules which facilitate interaction between the processing component 602 and other components. For instance, the processing component 602 may include a multimedia module to facilitate interaction between the multimedia component 608 and the processing component 602.

The memory 604 is configured to store various types of data to support the operation of the electronic device. Examples of such data include instructions for any applications or methods operated on the electronic device, contact data, phonebook data, messages, pictures, video, etc. The memory 604 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, and a magnetic or optical disk.

The power component 606 provides power for various components of the electronic device. The power component 606 may include a power management system, one or more power supplies, and other components associated with generation, management and distribution of power for the electronic device.

The multimedia component 608 includes a screen providing an output interface between the electronic device and a user. In some embodiments, the screen may include a liquid crystal display (LCD) and a touch panel (TP). if the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 608 includes a front camera and/or a rear camera. The front camera and/or the rear camera may receive external multimedia data when the electronic device is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), The MIC is configured to receive an external audio signal when the electronic device is in the operation mode, such as a call mode, a recording mode and a voice recognition mode. The received audio signal may further be stored in the memory 604 or sent through the communication component 616. In some embodiments, the audio component 610 further includes a speaker configured to output the audio signal.

The I/O interface 612 provides an interface between the processing component 602 and a peripheral interface module. The peripheral interface module may be a keyboard, a click wheel, a button and the like. The button may include, but not limited to: a home button, a volume button, a starting button and a locking button.

The sensor component 614 includes one or more sensors configured to provide status assessment in various aspects for the electronic device. For instance, the sensor component 614 may detect an on/off status of the electronic device and relative positioning of components, such as a display and small keyboard of the electronic device. The sensor component 614 may further detect a change in a position of the electronic device or a component of the electronic device, presence or absence of contact between the user and the electronic device, orientation or acceleration/deceleration of the electronic device and a change in temperature of the electronic device. The sensor component 614 may include a proximity sensor configured to detect presence of an object nearby without any physical contact. The sensor component 614 may also include a light sensor, such as a complementary metal oxide semiconductor (CMOS) or charge coupled device (CCD) image sensor, configured for use in an imaging application. In sonic embodiments, the sensor component 614 may also include an acceleration sensor, a gyroscope sensor, a magnetic sensor, a pressure sensor or a temperature sensor.

The communication component 616 is configured to facilitate wired or wireless communication between the electronic device and other devices. The electronic device may access a communication-standard-based wireless network, such as a WIFI network, a 3G or 4G network or a combination thereof. In an embodiment, the communication component 616 receives a broadcast signal or broadcast associated information from an external broadcast management system through a broadcast channel. In an embodiment, the communication component 616 further includes a near field communication (NFC) module to facilitate short-range communication. In an embodiment, the communication component 616 may be implemented on the basis of radio frequency identification (RFID) technology, an infrared data association (IrDA) technology, an ultra-wideBand (UWB) technology, a BT technology and other technologies.

In an embodiment, the electronic device may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, and is configured to execute the above-described methods.

In an embodiment, there is also provided a non-transitory computer-readable storage medium including instructions, such as the memory 502 including instructions, and the instructions may be executed by the processor 502 of the electronic device to perform the above-described methods. For example, the non-transitory computer-readable storage medium may be a ROM, a random access memory (RAM), a compact disc read-only memory (CD-ROM), a magnetic tape, a floppy disc, an optical data storage device and the like. When instructions in the storage medium are executed by a processor of an electronic device, the electronic device is caused to perform the above-described information sharing method.

Other implementation solutions of the present disclosure will be apparent to those of ordinary skill in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for sharing information, implemented by a first electronic device, comprising:
responsive to detecting a sharing request triggered by a first user, determining whether a second operation, in addition to a first operation, is required to be performed by a second electronic device based on uniform resource locator (URL) information of content to be shared to view the content to be shared, wherein the first operation comprises opening a page corresponding to the URL information of the content to be shared; and the second operation comprises logging into the page corresponding to the URL information of the content to be shared, or accessing a same network as the first electronic device;
responsive to determining that the second operation is required to be performed by the second electronic device based on the URL information of the content to be shared to view the content to be shared, automatically acquiring a screenshot of the content to be shared; and
sending the screenshot of the content to be shared to the second electronic device to enable a second user of the second electronic device to view the content to be shared based on the screenshot of the content to be shared,
wherein when the second operation comprises the logging into the page corresponding to the URL information of the content to be shared, determining whether the second operation is required to be performed by the second electronic device based on the URL information of the content to be shared to view the content to be shared comprises:
determining whether the first user is in a logged-in state, wherein the logged-in state is a state after logged in with account information of the first user; and
responsive to determining that the first user is in the logged-in state, determining that the second operation is required to be performed by the second electronic device based on the URL information of the content to be shared to view the content to be shared.

2. The method of claim 1, wherein, when the second operation comprises the accessing the same network as the first electronic device, determining whether the second operation is required to be performed by the second electronic device based on the URL information of the content to be shared to view the content to be shared comprises:
determining whether a network in which the first electronic device is located is a private network; and
responsive to determining that the network in which the first electronic device is located is the private network, when a network in which the second electronic device is located is not the private network, determining that the second operation is required to be performed by the second electronic device based on the URL information of the content to be shared to view the content to be shared.

3. The method of claim 2, further comprising:
before determining whether the second operation is required to be performed by the second electronic device based on the URL information of the content to be shared to view the content to be shared, sending a request message to the second electronic device, wherein the request message is to request an indication whether the network in which the second electronic device is located is the private network; and
receiving response information sent by the second electronic device, wherein the response information indicates whether the network in which the second electronic device of the second user is located is the private network.

4. The method of claim 2, further comprising:
responsive to determining that the network in which the first electronic device is located is not the private network, determining whether the first user is in the logged-in state; and
responsive to determining that the first user is in the logged-in state, determining that the second operation is required to be performed by the second electronic device based on the URL information of the content to be shared to view the content to be shared.

5. The method of claim 4, further comprising:
responsive to determining that the network in which the first electronic device is located is not the private network and that the first user is in a non-logged-in state, sending the URL information of the content to be shared to the second electronic device.

6. The method of claim 4, wherein determining whether the first user is in the logged-in state comprises:
extracting a URL feature from the URL information of the content to be shared; and
determining whether the first user is in the logged-in state based on the URL feature.

7. The method of claim 1, wherein sending the screenshot of the content to be shared to the second electronic device comprises:
sending the screenshot and the URL information of the content to be shared to the second electronic device.

8. A first electronic device, comprising:
a processor;
a memory configured to store instructions executable by the processor; and
a transmitter,
wherein the processor is configured to, responsive to detecting a sharing request triggered by a first user, determine whether a second operation, in addition to a first operation, is required to be performed by a second electronic device based on uniform resource locator (URL) information of content to be shared to view the content to be shared, wherein the first operation comprises opening a page corresponding to the URL information of the content to be shared; and the second operation comprises logging into the page corresponding to the URL information of the content to be shared, or accessing a same network as the first electronic device, and responsive to determining that the second operation is required to be performed by the second electronic device based on the URL information of the content to be shared to view the content to be shared, automatically acquire a screenshot of the content to be shared; and
the transmitter is configured to send the screenshot, acquired by the processor, of the content to be shared to the second electronic device to enable a second user of the second electronic device to view the content to be shared based on the screenshot of the content to be shared,
wherein, when the second operation comprises the logging into the page corresponding to the URL information of the content to be shared, the processor is further configured to:
determine whether the first user is in a logged-in state, wherein the logged-in state is a state after logged in with account information of the first user; and
responsive to determining that the first user is in the logged-in state, determine that the second operation is required to be performed by the second electronic device based on the URL information of the content to be shared to view the content to be shared.

9. The first electronic device of claim 8, wherein, when the second operation comprises the accessing the same network as the first electronic device, the processor is further configured to:
determine whether a network in which the first electronic device is located is a private network; and
responsive to determining that the network in which the first electronic device is located is the private network, when a network in which the second electronic device is located is not the private network, determine that the second operation is required to be performed by the second electronic device based on the URL information of the content to be shared to view the content to be shared.

10. The first electronic device of claim 9, wherein the transmitter is further configured to:
send a request message to the second electronic device, wherein the request message is to request an indication whether the network in which the second electronic device is located is the private network; and
the first electronic device further comprises:
a receiver configured to receive response information sent by the second electronic device, wherein the response information indicates whether the network in which the second electronic device is located is the private network.

11. The first electronic device of claim 9, wherein the processor is further configured to:
responsive to determining that the network in which the first electronic device is located is not the private network, determine whether the first user is in the logged-in state; and
responsive to determining that the first user is in the logged-in state, determine that the second operation is required to be performed by the second electronic device based on the URL information of the content to be shared to view the content to be shared.

12. The first electronic device of claim 11, wherein the transmitter is further configured to:
responsive to that the processor determines that the network in which the first electronic device is located is not the private network and that the first user is in a non-logged-in state, send the URL information of the content to be shared to the second electronic device.

13. The first electronic device of claim 11, wherein the processor is configured to:
extract a URL feature from the URL information of the content to be shared; and
determine whether the first user is in the logged-in state based on the URL feature.

14. The first electronic device of claim 8, wherein the transmitter is further configured to:
send the screenshot and the URL information of the content to be shared to the second electronic device.

15. A non-transitory computer-readable storage medium having stored thereon a computer program that, when executed by a processor of a first electronic device, causes the first electronic device to perform a method comprising:
responsive to detecting a sharing request triggered by a first user, determining whether a second operation, in addition to a first operation, is required to be performed by a second electronic device based on uniform resource locator (URL) information of content to be shared to view the content to be shared, wherein the first operation comprises opening a page corresponding to the URL information of the content to be shared; and the second operation comprises logging into the page corresponding to the URL information of the content to be shared, or accessing a same network as the first electronic device;

responsive to determining that the second operation is required to be performed by the second electronic device based on the URL information of the content to be shared to view the content to be shared, automatically acquiring a screenshot of the content to be shared; and sending the screenshot of the content to be shared to the second electronic device to enable a second user of the second electronic device to view the content to be shared based on the screenshot of the content to be shared, wherein, when the second operation comprises the logging into the page corresponding to the URL information of the content to be shared, determining whether the second operation is required to be performed by the second electronic device based on the URL information of the content to be shared to view the content to be shared comprises:

determining whether the first user is in a logged-in state, wherein the logged-in state is a state after logged in with account information of the first user; and responsive to determining that the first user is in the logged-in state, determining that the second operation is required to be performed by the second electronic device based on the URL information of the content to be shared to view the content to be shared.

16. The non-transitory computer-readable storage medium of claim 15, wherein, when the second operation comprises the accessing the same network as the first electronic device, determining whether the second operation is required to be performed by the second electronic device based on the URL information of the content to be shared to view the content to be shared comprises:

determining whether a network in which the first electronic device is located is a private network; and responsive to determining that the network in which the first electronic device is located is the private network, when a network in which the second electronic device is located is not the private network, determining that the second operation is required to be performed by the second electronic device based on the URL information of the content to be shared to view the content to be shared.

17. The non-transitory computer-readable storage medium of claim 16, wherein the method further comprises:

before determining whether the second operation is required to be performed by the second electronic device based on the URL information of the content to be shared to view the content to be shared, sending a request message to the second electronic device, wherein the request message is to request an indication whether the network in which the second electronic device of the second user is located is the private network; and receiving response information sent by the second electronic device, wherein the response information indicates whether the network in which the second electronic device is located is the private network.

18. The non-transitory computer-readable storage medium of claim 16, wherein the method further comprises:

responsive to determining that the network in which the first electronic device is located is not the private network, determining whether the first user is in the logged-in state; and responsive to determining that the first user is in the logged-in state, determining that the second operation is required to be performed by the second electronic device based on the URL information of the content to be shared to view the content to be shared.

* * * * *